United States Patent
Diekhans

[19]
[11] Patent Number: 6,073,428
[45] Date of Patent: Jun. 13, 2000

[54] DEVICE FOR REGULATING DRIVE ENGINE POWER OUTPUT

[75] Inventor: Norbert Diekhans, Gütersloh, Germany

[73] Assignee: Claas Selbstfahrende Erntemaschinen GmbH, Harsewinkel, Germany

[21] Appl. No.: 09/151,166

[22] Filed: Sep. 10, 1998

[30] Foreign Application Priority Data

Sep. 13, 1997 [DE] Germany .................. 197 40 346

[51] Int. Cl.⁷ .......................... A01D 43/08; F02D 31/00
[52] U.S. Cl. ............................ 56/10.2 R; 123/352
[58] Field of Search ............ 56/1, 10.2 R, 10.2 A, 56/10.2 G, 10.2 N, 10.5, 10.6, 10.7, 10.8, 11.4, DIG. 15; 123/352; 477/73, 107, 203, 902; 180/53.4; 74/11; 364/424.1

[56] References Cited

U.S. PATENT DOCUMENTS

| | | | |
|---|---|---|---|
| 4,370,961 | 2/1983 | Brown | 123/352 |
| 4,372,265 | 2/1983 | Kasiewicz | 123/352 |
| 5,463,992 | 11/1995 | Swenson et al. | 123/198 R |
| 5,517,965 | 5/1996 | Notsu et al. | 123/352 |
| 5,611,751 | 3/1997 | Ehrenhardt et al. | 477/73 |

FOREIGN PATENT DOCUMENTS

| | | | |
|---|---|---|---|
| 67 50 266 | 1/1969 | Germany . | |
| 24 36 072 | 2/1975 | Germany | A01D 41/12 |
| 35 05 887 A1 | 9/1985 | Germany | A01D 43/08 |
| 36 11 553 C1 | 7/1987 | Germany | F02D 29/04 |
| 38 10 724 A1 | 12/1988 | Germany | B60K 41/00 |
| 39 11 706 A1 | 10/1990 | Germany | F02D 29/00 |
| 39 11 708 C2 | 10/1990 | Germany | F02D 41/00 |
| 42 10 956 A1 | 2/1993 | Germany | B60K 26/00 |
| 43 41 834 C1 | 4/1995 | Germany | A01D 41/00 |
| 195 06 533 A1 | 8/1995 | Germany | F02D 31/00 |
| 196 24 085 A1 | 12/1996 | Germany | F02D 1/02 |
| 2 234 328 | 1/1991 | United Kingdom | B60K 41/00 |

*Primary Examiner*—Robert E. Pezzuto
*Attorney, Agent, or Firm*—Husch & Eppenberger, LLC; Robert E. Muir

[57] ABSTRACT

A working machine has a drive engine, a transmission for the main drive and at least one power take-off. The power of the drive engine is branched in a first section to the main drive and in a second section to the power take-offs. A measuring device measures the power-limiting variable acting on an output drive. Measuring devices are provided on the working machine for determining the variable having a power-limiting effect on the respective power take-offs and on the transmission, such as for example a torque, a hydraulic pressure or an adjusting lever deflection. These are supplied as signals to an evaluating and control device which, based upon these input signals, generates a control signal for a power regulator which regulates the output power of the drive engine.

33 Claims, 4 Drawing Sheets

DEVICE FOR REGULATING DRIVE ENGINE POWER OUTPUT

BACKGROUND OF THE INVENTION

The present invention relates generally to agricultural machinery and, more particularly to improvements to self-propelled agricultural machines or to machines which tow or carry implements that are driven via at least one power take-off.

Agricultural machines of this kind generally have a drive engine whose drive power is branched to the main drive and at least one power take-off for driving the implements. At least one measuring device directly or indirectly determines the power transmitted to a power take-off and, in case of overload, generates a control signal for a power regulator for regulating the output power of the drive engine.

Self-propelled working machines of this kind include, for example, agricultural machines, such as combine harvesters, field choppers or tractors, and also construction machinery.

For example, a self-propelled combine harvester has a mechanical or hydrostatic drive arranged behind the drive engine, from which the drive power is transmitted to the drive wheels. A plurality of implements (cutter bar, threshing and separating members, straw chopper, blower, elevator, etc.), are driven apart from the main drive. These implements are driven directly or indirectly as power take-offs by the engine shaft of the drive engine.

With a self-propelled field chopper, the power take-offs function as a means for driving an attachment, the chopper unit, the ejection accelerator and other implements. These implements are operated sometimes parallel and adjacent each other, and sometimes in tandem, one behind the other in a drive train.

With tractors it is known that in addition to the main drive and the hydraulic pumps a power take-off (pto) shaft can be provided for driving additional implements. For cost reasons it is advantageous to drive as many additional implements as possible by means of the drive engine of the tractor. This has led to many tractors having two power take-off shafts (one rear power take-off shaft and one front power take-off shaft). With some tractors there is an additional power take-off shaft at the top for transmitting the drive engine power to additional implements in the upper body region of the tractor.

To satisfy the power requirements of these self-propelled working machines for the main drive and the power take-offs, an increasing output power of the drive engine is necessary. However, due to design limitations, the individual implements and the transmission for the main drive may be operated only up to a maximum input power or torque. Therefore, in certain working situations the drive engine generates a higher torque than can be accommodated by the power take-offs or the transmission, thereby damaging or increasing wear of the drive elements, implements or transmission.

This problem is addressed in German Patent 196 24 085 A1. There, a self-propelled working machine in the form of a cement truck is described which, in addition to the main drive, has a cement mixer driven by the drive engine via the power take-off. The main drive for the cement truck requires a drive engine which is capable of developing torques significantly greater than the maximum permitted torque for the cement mixer. In a cement truck there are basically two working situations: a) road travel of the cement truck with simultaneous driving of the cement mixer; or b) stationary operation of the cement truck with the cement mixer being driven. In working situation b), where the torque of the drive engine is allocated solely to the cement mixer, it is possible for the maximum permitted torque for the cement mixer to be exceeded. For this reason, in working situation b), German Patent 196 24 085 A1 proposes a power regulator to automatically limit the torque of the drive engine when the maximum permitted torque of the cement mixer is reached. However, so that automatic torque limiting can take place, the operator must first activate this limit control by an on/off switch. Furthermore, the overload protection is designed only to protect the cement mixer during stationary operation while the main drive is at a standstill and does not protect the main drive. Beyond the simple function of protecting the cement mixer, the proposed torque monitoring allows no further control over the drive engine.

With the above-mentioned agricultural machines the problem is more complex because i) in addition to the main drive, there are several power take-offs with a larger number of implements; ii) the number of working situations is greater than in the case of the cement truck according to German Patent 196 24 085 A1; and iii) each working situation has different torque requirements for the power take-offs and the main drive. To regulate the drive engine it is desirable not only to protect a single implement against overload by reducing the engine power, but also to regulate the drive engine in such a way that maximum power is available for the working functions of the self-propelled working machine without any of the implements being overloaded in their function.

Different working situations for a combine harvester and a constantly changing load situation of the individual implements arise, for example, when driving in standing crops with different density, when harvesting on hilly land, when harvesting in different soil conditions, when travelling on a road, etc. Frequent changes between different working situations are not uncommon. Moreover the change between different working situations can be made in small steps or quite suddenly.

In a tractor with several power take-off shafts, an important operational factor is which of the attachments are connected. Also, it is significant whether two or even three power take-off shafts are operated simultaneously. Therefore, a large number of permutations of working situations are possible.

It is an object of the present invention to overcome one or more of the problems described above.

Another object of the invention is to further develop a working machine in such a way that optimum operation in different working situations is made possible in a reliable and user-friendly manner, without overloading individual power take-offs or the main drive.

SUMMARY OF THE INVENTION

According to the present invention there is provided a working machine having a main drive; at least one power take-off for driving implements; a drive engine whose drive power selectively is divided to the main drive and the power take-off; measuring devices provided in the respective power take-offs and in the main drive for determining at least one power-limiting variable and delivering a signal correlative thereto; an evaluating and control device which receives the signals, processes the signals, and generates a control signal as a function of the signals; and a regulator for receiving the control signal and regulating the output power of the drive engine.

According to another aspect of the invention there is provided a working machine having implements, an evaluating and control device for generating a control signal, a power regulator, a fuel injection pump, a drive engine whose drive power is branched to a main drive and at least one power take-off for driving the implements, and wherein the drive power of the drive engine directly controls the fuel injection pump via the power regulator which, in case of altered power requirements, receives the control signal from the evaluating and control device for the fuel injection pump such that the drive engine is adapted to new power requirements.

Objects are achieved by virtue of measuring devices for determining at least one power-limiting variable, which are provided in the respective power take-offs and in the main drive. An evaluating and control device which receives the variables determined by the measuring devices in the form of known input signals is also provided. The evaluating and control device generates a control signal, as a function of these input signals, for a power regulator for regulating the output power of the drive engine. The evaluating and control device stores the maximum permitted power-limiting variable for at least one power take-off and the main drive by means of control software. Upon exceeding the measured variable at one of the power take-offs and/or at the main drive, the evaluating and control device generates a trigger signal for reducing the output power of the drive engine and upon elimination of the reduction criterion, adapts the output power of the drive engine to the new permitted power limit.

The respective power-limiting variables such as speed, torque, pressure, voltage or current, can be determined using a measuring device known in the art. In this case it is provided that the torques can be determined directly by means of corresponding torque pick-ups on the power-transmitting shafts for the main drive and the power take-offs. Instead of directly determining torque, the evaluating and control device can also use indirect measuring methods which reflect the load on the individual components, which are known to the expert. For example, in the case of self-propelled working machines having a hydrostatic transmission, this indirect measuring method can be a pressure sensor for the hydraulic pressure and a sensor for the volume flow of the hydraulic fluid. With power take-offs which are driven by belts, the torque can for example also be determined indirectly by corresponding measuring devices for determining belt slippage. Furthermore adjusting lever paths, the deflection at belt or the chain tensioner, servo motor currents or drive engine currents can reflect power in a drive train.

The above-mentioned self-propelled working machines mainly use diesel engines, which preferably have an electronically controlled injection pump for power regulation, as drive engines. The fuel quantities injected by the injection pump into the combustion chambers of the drive engine can easily be influenced by a control signal to the injection pump, which has a direct effect on the power capacity of the drive engine.

In one preferred embodiment, the maximum permitted torque is stored in the evaluating and control device for each power take-off and for the main drive. Thus if the measured torque exceeds the permitted torque at one of the power take-offs or at the main drive, a control signal for reducing the engine output power can be generated in the evaluating and control device, thus preventing damage to the power take-off or the main drive. With this kind of "overload control management" it is unnecessary for the operator of the self-propelled working machine to be informed which particular power take-offs are currently operative and what load limit values exist for them.

In another preferred embodiment, a control signal can induce additional power of the drive engine by means of the proposed measurement of torques, pressures or voltages if, for the evaluating and control device, it is obvious with reference to the measured values that at least one of the implements or the main drive is not overloaded by short-term additional power of the drive engine or if the connection of additional implements must be bridged. This is the case for example when all or certain power take-offs and/or the main drive are operated within a predetermined torque range which is maintained even after an increase in power. Thus, for example, the engine output power can be increased above a nominal value without endangering the main drive in a harvesting application of a combine harvester on an uphill slope while the threshing mechanism is running, which on the road and without connection of the additional implements would mean an overload on the main drive.

It is particularly advantageous if the maximum permitted torques of the individual power take-offs can be stored variably. For example, it would be desirable if the most varied attachments can be connected to a tractor with several power take-off shafts and operated simultaneously without there being a risk of overloading individual attachments. The operator must simply store the maximum permitted torques for the power take-offs as a function of the attachments to be connected. This can be done by manual entry of the values or simply by selection of the appropriate attachment (cutter bar, digger, manufacturer, model) from a list of attachments stored in the central computer of the working machine, which stores the associated limit values. By this means maximum flexibility and reliability are achieved.

In another embodiment it is provided that in addition to the torques of the power take-offs and the main drive, at least one additional operation-limiting variable and at least one parameter which limits the power take-offs and/or the main drive is used in the evaluating and control device for power regulation of the drive engine. As a result, further operational reliability is provided and the drive engine is integrated in power regulation. Thus drive engine power-limiting parameters such as cooling water or oil temperature of the drive engine can be used in the evaluating and control device for power regulation of the drive engine. If the evaluating and control device detects via a suitable sensor mechanism that the values of the power-limiting parameters are approaching the limit of their tolerable range, the evaluating and control device can via a suitable control algorithm regulate the drive power of the drive engine in such a way that the proximity curve of approximation to the limit value of the power-limiting parameter flattens out to such an increasing extent that the limit value is slowly reached as an approximation. This ensures that a reduction of the engine power is not abrupt, but steady. Such an arrangement results in extra operational reliability, while only slightly impairing the function of the working machine.

A further improvement in the action of the apparatus arises when suitable sensors in front of an implement, which picks up a larger proportion of the available drive power, detect the variations in flowing quantities of material and transmit them to the evaluating and control device. The evaluating and control device can then detect the power requirements in advance and generate an adjusting signal for a power increase of the engine and/or drives and transmit the signal to them. The subsequent load peak at an implement is then taken up by the additional flywheel effect and/or the increased drive moment. Furthermore, it is also conceivable to reduce the engine power with decreasing power requirements, in order to save fuel. Such a system can, for example, in a field chopper with high power requirements of the chopper drum, serve to prevent a greater speed drop of all components and also to equalize the working speed, so that dispensing of the stream of material onto a transfer vehicle, such as a truck or wagon, traveling alongside is not disturbed.

The present invention can be used not only in self-propelled working machines, but also for the combination of a tractor with an implement towed or carried by the tractor, whose implements are driven by the tractor via at least one power take-off. For this purpose an interface may be provided between the attachment and the working machine in which, for example, a torque at a power take-off or at an output drive further branched off the latter, are transmitted to the evaluating and control device by means known in the art such as a CAN bus system.

BRIEF DESCRIPTION OF THE DRAWINGS

In the attached drawings the invention will be illustrated below with the aid of practical examples.

DETAILED DESCRIPTION

Figure 1:
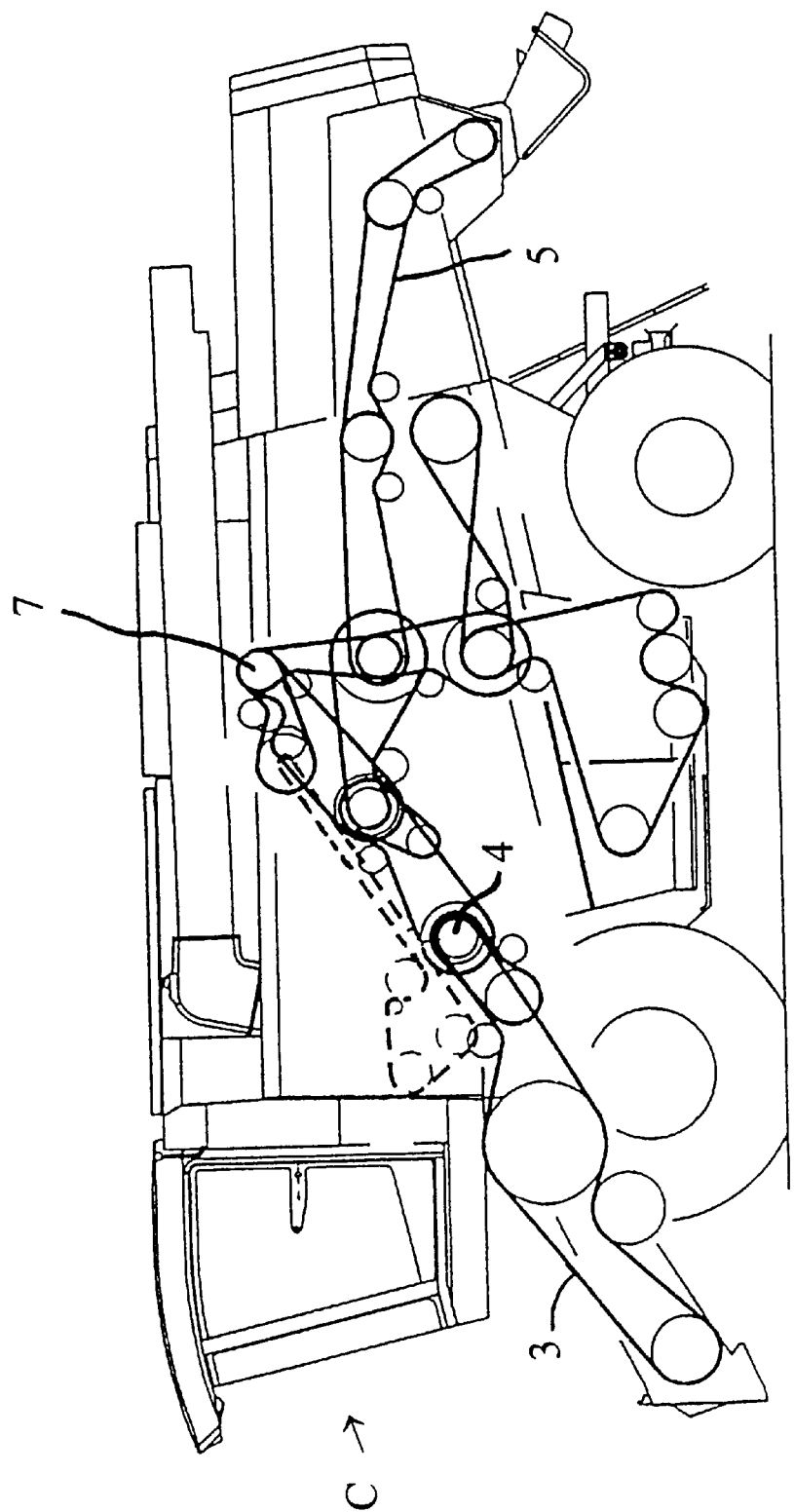
FIG. 1 is a schematic longitudinal section through a combine harvester showing its power take-offs (implements) which are driven by the drive engine.

FIG. 1 is shows a combine harvester C having implements, not shown in detail, located in close proximity to the drive engine, not shown, and driven via power take-offs. By way of example, the power take-offs include the pto to a cutter bar 3, the pto to threshing members 4 and the pto to a straw chopper 5. Other power take-offs or implements are not mentioned for reasons of brevity. An engine output drive 7 provides motive power to the power take-offs or implements 3–5.

Figure 2:
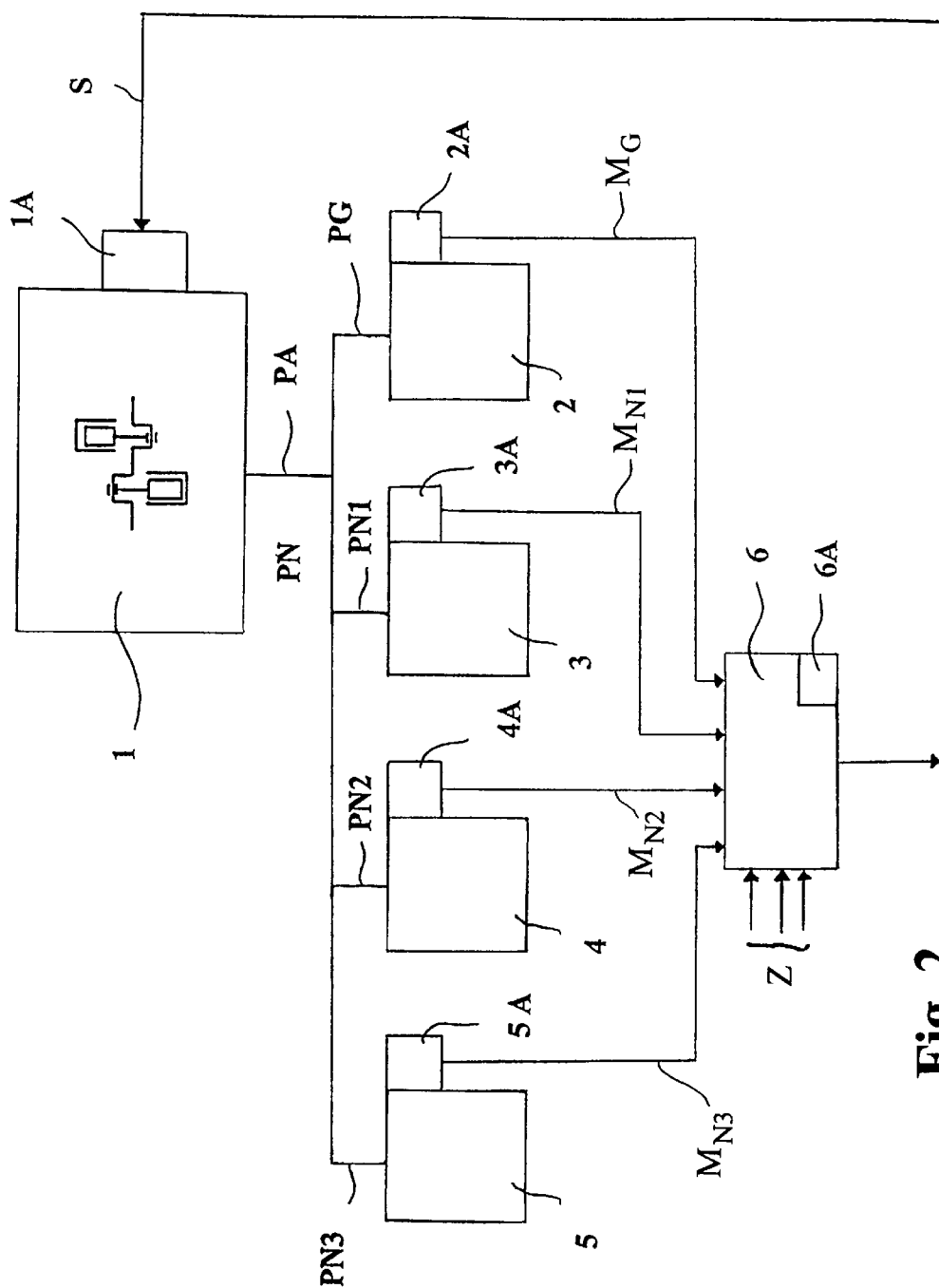
FIG. 2 is a block diagram of a drive arrangement utilized in the FIG. 1 embodiment.

FIG. 2 schematically shows a drive engine 1 with its power regulator 1A, a main drive 2 and three power take-offs 3, 4, 5. Engine output power PA is distributed to a transmission input PG and to pto inputs PN1, PN2, PN3. Measuring devices 2A, 3A, 4A, 5A detect the power-limiting variables, which are measures of several torques in this case, and deliver respective input signals $M_G$, $M_{N1}$, $M_{N2}$, $M_{N3}$ to a evaluating and control device 6, which may be a microprocessor. The evaluating and control device 6 receives the measured values from the measuring devices 2A, 3A, 4A, 5A and processes them into a control signal S. Evaluation programs and limit values of the individual drives are stored in a memory 6A. For example, the information is processed into a control signal S by an evaluating program which comprises suitable software for comparing the measured values with the stored limit values. If the stored limit values of one or more implements (e.g. 3–5) and/or the main drive 2 are exceeded or if the measured values are well below the permitted limit values, then a control signal S derived from the difference between measured values and stored limit values is transmitted to the power regulator 1A. The derivation can take place for example by a stored characteristic diagram or by a suitable control algorithm. If the subsequent comparison of the measured values with the limit values yields a variation in the differential value, then the evaluating and control device 6 determines a new control signal S which is again transmitted to the power regulator 1A. If the comparison of the measured values with the limit values takes place in a short time sequence, then closely stepped regulation is achieved, which is perceived by the self-propelled working machine operator as progressive and without sudden changes in regulation.

Regulation in this manner makes it possible to avoid overloading the implements 3–5 or the main drive 2 by reducing the drive power of the drive engine 1. However, it is also possible to mobilize power reserves of the drive engine 1 when the sensor mechanism detects incomplete loading of the main drive 2 or of one of the power take-offs 3, 4, 5. In both directions of regulation it is advantageous to include operating parameters of the drive engine 1 in the regulating process. Therefore the evaluating and control device 6 can scan parameters Z such as coolant and/or oil temperature of the drive engine 1, the boost pressure of a turbocharger (not shown), ignition time of combustion in the drive engine 1 or valve control times, and include them in the process of determining the control signal S. In such an embodiment the drive engine 1 itself is included in regulation of the drive system and is protected against overloading and excessive wear. Moreover other operating data can be taken into consideration as parameters Z.

Manually entered or automated variation standards for stored limit values or control algorithms can also be processed by the evaluating and control device 6 as parameters Z. Thus, limit values can vary when implements such as cutter bars are changed or when attachments are connected such as special processing, chopping or cutting devices of the working machine, such as combine harvester C or other machines. The stored limit values can be varied automatically, for example, by attachment detection switches which transmit their identification to the evaluating and control device upon connection of the attachment to the self-propelled working machine. The stored limit values can also be varied automatically as a routine which detects connection or disconnection of a component, for example by control switch scanning.

The power control signal S is a function of the different power-limiting variables such as the individual torques: $S=f(M_G, M_{N1}, M_{N2}, M_{N3}, \ldots )$. Here $M_G$ denotes the torque acting on the main drive 2 and $M_N \ldots$ denotes the torque acting upon the power take-offs 3–5. Suitable programs in the evaluating and control device 6, which is preferably formed by a microprocessor and equipped with suitable software, can evaluate the linked input signals according to the most varied criteria. As a result, adequate automatic power management is made possible for the first time for self-propelled working machines where, in addition to the main drive, several power take-offs which are driven by the single drive engine are provided, are required to cover a broad spectrum of working situations, each with different power requirements. The drive engine power can accordingly be automatically decreased or increased, thereby limiting the restriction of drive power to the absolutely necessary amount. Furthermore, the engine power provided is continuously readapted to the currently prevailing working conditions. Automated regulation of the drive power of the drive engine is user-friendly, as the driver does not need to intervene in the regulating operations.

In another embodiment different weighting factors (X1, X2, X3) are provided in the evaluating and control device 6 for the power take-offs 3–5 to determine the control signal S for power regulation of the drive engine: $S=f(M_G, X1*M_{N1}, X2*M_{N2}, X3*M_{N3}, \ldots)$. Preferably the weighting factors can be stored variably. Hence dominant power consumers can be selected and priorities in power management can be set.

Figure 3:
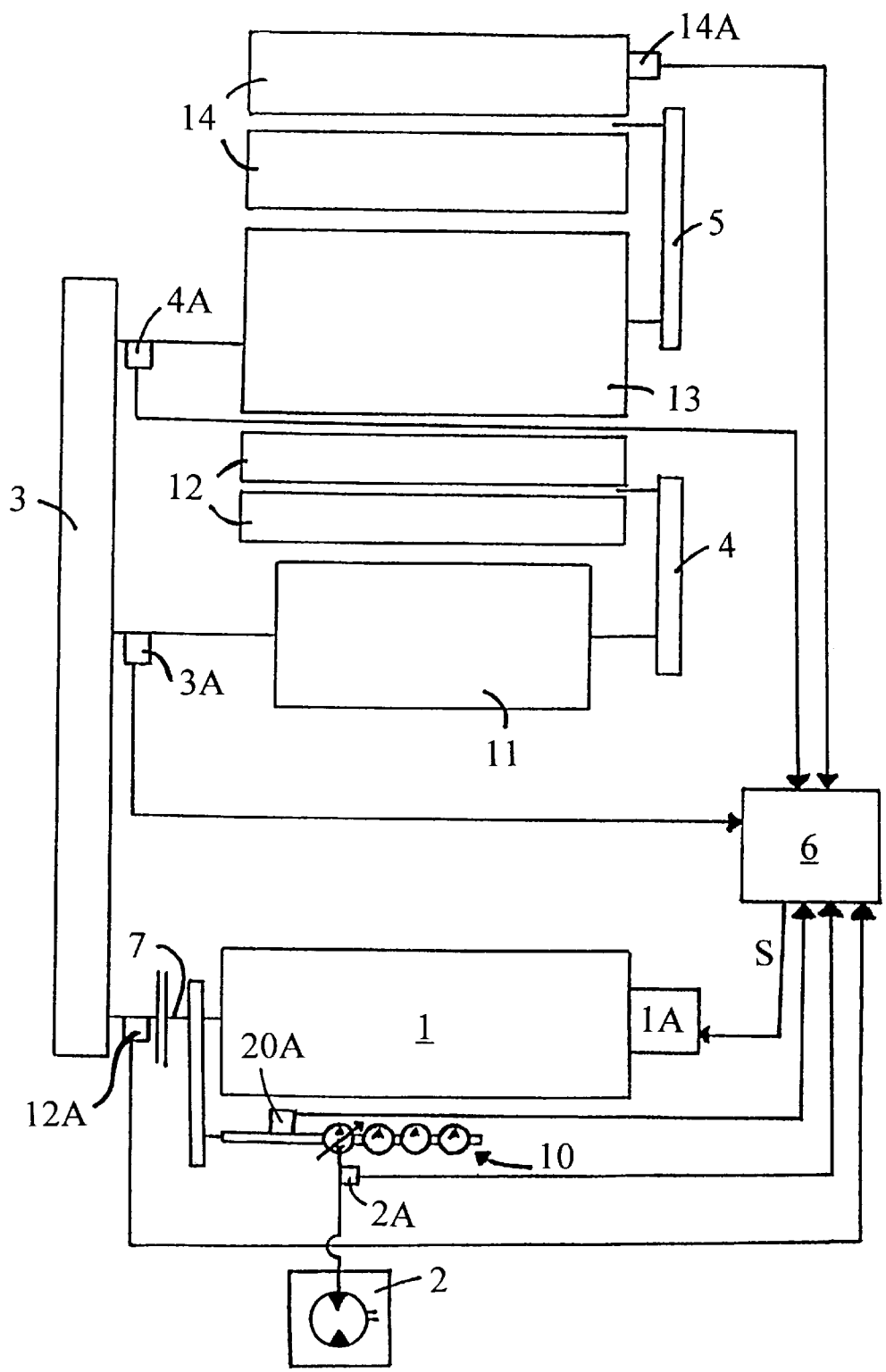
FIG. 3 is a diagrammatic view of a drive arrangement of a self-propelled forager.

FIG. 3 is a diagram of a drive arrangement of a self-propelled forager. The drive engine 1 transmits its drive power to the power take-offs 3, 4, 5 via the engine output drive 7. Hydraulic pumps 10, whose drive power is monitored by the sensor 20A, are connected to the engine output drive 7 for the main drive 2 and individual adjusting functions. The drive power is transmitted to a blower 11, corn cracker rollers 12, a cutting cylinder 13, and intake and prepressing rollers 14 by means of the power take-offs 3, 4, 5. The drive power transmitted by the power take-off 3 is monitored by sensors 20A, 12A, 3A, 4A each of which are mounted on the drive shafts and which transmit their sensor data to the evaluating and control device 6. The evaluating and control device 6 in turn transmits a control signal S to the power regulator 1A of the drive engine 1.

For practicing the invention it is unimportant, independently of the practical example shown in FIG. 3, whether the limit value comparison is made only in the evaluating and control device 6 or whether the comparison is already made in the sensors 2A, 3A, 4A, 5A, 20A. For the comparison to be made in the sensors 2A, 3A, 4A, 5A, 20A requires corresponding computer elements for evaluation and storage, for comparison and for output of the measured values. Furthermore, the sensors 2A, 3A, 4A, 5A, 12A, 20A must transmit only a processed signal to the evaluating and control device 6. For a higher speed of regulation of the evaluating and control device 6 it may be advantageous if the evaluating and control device 6 no longer has to perform all evaluations itself, but only has to evaluate ratio values transmitted by the sensors 2A, 3A, 4A, 5A, 20A. Also, a CAN bus network connected to all system components and the sensors 2A, 3A, 4A, 5A, 12A, 20A would be subjected to a smaller quantity of data. If an overload is indicated by one of the sensors 2A, 3A, 4A, 12A, 20A, the evaluating and control device 6 transmits an adjusting signal S which causes the reduction of the engine power of the drive engine 1. If the sensors 2A, 3A, 4A, 12A, 20A indicate that the limit values have not been reached, the evaluating and control device 6 can transmit an adjusting signal S which either decreases the engine power or increases the engine power in order to obtain matched working power of the self-propelled working machine. Regulation is only dependent on the regulation standards which can be entered manually by the driver or which are on file and can be called up from a memory.

A sensor 14A connected to an intake and prepressing roller 14 determines the deflection thereof due to the quantity of crop material. Because the deflection behaves approximately proportionally to the quantity of crop material picked up, the subsequent load on the implements may also be determined. The measured value is transmitted to the evaluating and control device 6. If a comparison of the measured values of the sensors 4A, 14A indicates that the currently transmitted torque will probably be insufficient for processing the quantity of crop material picked up by the cutting cylinder 13, without a major decline in operation, then the evaluating and control device 6 can transmit an adjusting signal S to the power regulator 1A, thereby increasing the drive power or speed of the drive engine 1 for a short time to ensure trouble-free processing of the quantity of crop material produced. A sensor mechanism of the sensor 14A could also measure the deflection of the hold-down device, the torque of the feed screw or the pick-up. Furthermore, a laser scanner could sense the height of the swathe in front of the self-propelled field chopper. A sensor mechanism can, in a corresponding manner, be integrated in any other self-propelled working machine. For example, a sensor mechanism can be integrated in a cutter bar or sloping conveyor channel of a combine harvester or a towed or self-propelled baling press.

Figure 4:
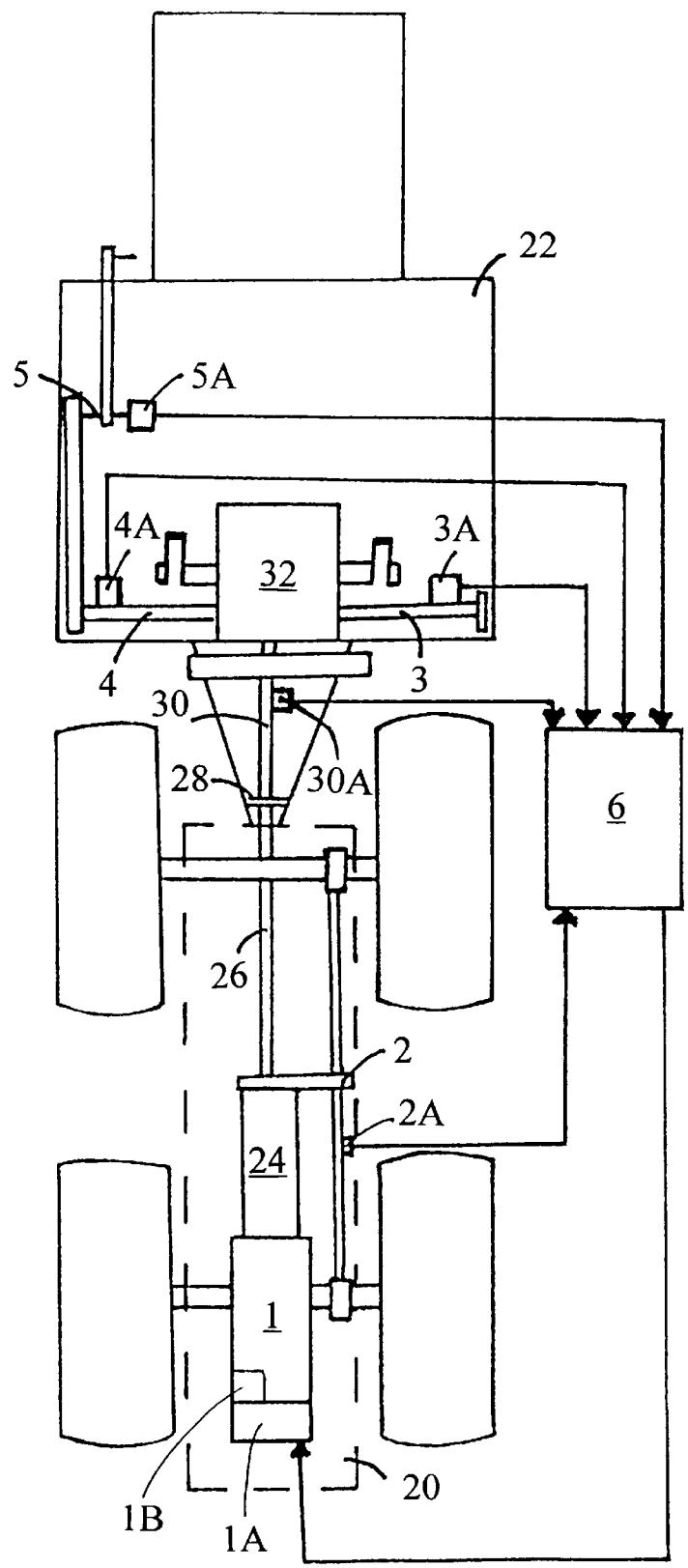
FIG. 4 is a diagrammatic plan view of a tractor towing a working machine such as a baler.

FIG. 4 schematically shows a tractor 20 with an attached baler 22 which may be a large baling press. The tractor 20 has a drive engine 1 which transmits its drive power to a transmission 24. The drive power is transmitted from the drive engine 1 to a drive train to the main drive 2, here shown with an all-wheel drive, and to a power take-off shaft 26. A clutch 28 transmits the drive power of the power take-off shaft 26 to an articulated or flexible shaft 30 of the large baling press 22. The articulated shaft 30 applies the drive power to a main transmission 32 of the towed large baling press. From the main transmission 32, different implements of the large baling press 22, including a pick-up device, a conveying device and a tying device are driven by the power take-offs 3, 4, 5, respectively. In this embodiment, power take-off 5 is shown as a layshaft or overhead shaft. The sensors 2A, 3A, 4A, 5A, 30A mounted on the drive components 2, 30; as well as on the power take-offs 3–5 of the towed large baling press 22, are connected directly or by interfaces to the evaluating and control device 6, which may be on the tractor 20, the baler 22, or partly on each. After evaluation of the measured values, the evaluating and control device 6 transmits a control signal S derived therefrom to the power regulator 1A of the drive engine 1. In this way the proposed drive regulation can also be accomplished in a combination of a tractor with an implement which either is towed or carried by the tractor and whose implements are driven by power from the tractor. The term tractor, as used herein, is intended to include any machine which may tow or carry an implement.

In another embodiment it is provided that with a torque increase at one or more power take-offs 3–5, the evaluating and control device 6 generates a control signal S for the power regulator 1A controls a fuel injection pump 1B in such a way that for a short time the fuel injection quantity or the output power is increased and then decreased accordingly. With a harvesting machine, in a particularly advantageous manner, sensors are provided for determining the quantity of crop material in the flow of crop material through the machine, which allows the determination of altered power requirements for certain power take-offs beforehand. For instance, with a sensor in the intake channel of a combine harvester (FIG. 1), an increase in the crop material arriving at the threshing members 4 could be determined beforehand, whereupon the drive engine power is automatically increased for a short time. Hence in due time, energy is stored in the rotating threshing drum with its moment of inertia and is available when the large quantity of crop material has to be processed. This all takes place under the control of the evaluating and control device 6.

In another embodiment, power management is provided which allows essentially even operation of the working machine in cases of uneven loading. In case of a short-term power increase or a sudden speed drop without accelerator pedal displacement, the fuel injection quantity in the drive engine 1 is increased for a short time by means of a suitable control algorithm of the evaluating and control device 6. Subsequently, the fuel injection quantity is decreased to the original value with a larger time constant.

Other objects, features and advantages will be apparent to those skilled in the art. While preferred embodiments of the present invention have been illustrated and described, this has been by way of illustration and the invention should not be limited except as required by the scope of the appended claims.

What is claimed is:

1. A working machine having a main drive; a plurality of power take-offs for driving a plurality of implements; a drive engine whose drive power selectively is divided to the main drive and the power take-offs; measuring devices provided in the power take-offs and in the main drive for determining a power-limiting variable and delivering a signal correlative thereto; an evaluating and control device for receiving and processing the signals, and generating a control signal as a function of the signals; and a regulator for receiving the control signal and regulating the output power of the drive engine so that none of the power take-offs is overloaded.

2. A working machine according to claim 1, including a maximum permitted power-limiting variable stored in said evaluating and control device for the main drive and power take-offs.

3. A working machine according to claim 2, wherein said maximum permitted power-limiting variable is stored by means of control software when said measured limiting variable is exceeded for said power take-offs.

4. A working machine according to claim 2, wherein said maximum permitted power-limiting variable is stored by means of a control software when the measured limiting variable is exceeded at the main drive.

5. A working machine according to claim 1, wherein said evaluating and control device generates a trigger signal for reducing the output power of the drive engine and, upon elimination of the reduction criterion, adapts the output power of the drive engine to a new permitted power limit.

6. A working machine according to claim 1, wherein said evaluating and control device generates a trigger signal for reducing the speed of the drive engine and, upon elimination of the reduction criterion, adapts the output power of the drive engine to a new permitted power limit.

7. A working machine according to claim 1, wherein the output power of the drive engine is increased above a nominal value, while the power take-off and the main drive do not leave the predetermined power range, and upon elimination of the increase criterion, the output power of the drive engine is decreased.

8. A working machine according to claim 1, wherein the speed of the drive engine is increased above a nominal value, while the power take-offs and the main drive do not leave the predetermined power range, and upon elimination of the increase criterion, the speed of the drive engine is decreased.

9. A working machine according to claim 1, wherein said power-limiting variable, which is the maximum permitted in the individual power take-offs, is variably stored in said evaluating and control device.

10. A working machine according to claim 1, wherein different weighting factors for the power take-offs are provided in said evaluating and control device for determining the control signal for power regulation of the drive engine.

11. A working machine according to claim 10, wherein said weighting factors are variably stored in the evaluating and control device.

12. A working machine according to claim 1, wherein at least one parameter which limits operation of the drive engine, in addition to the power-limiting variables in the respective power take-offs and the main drive, is used in said evaluating and control device for power regulation of the drive engine.

13. A working machine according to claim 1, wherein at least one parameter which limits operation of the power take-off, in addition to the power-limiting variables in the respective power take-offs and the main drive, is used in said evaluating and control device for power regulation of the drive engine.

14. A working machine according to claim 1, wherein at least one parameter which limits operation of the main drive, in addition to the power-limiting variables in the respective power take-offs and the main drive, is used in said evaluating and control device for power regulation of the drive engine.

15. A working machine according to claim 12, wherein said parameter is formed by other operational data of the main drive.

16. A working machine according to claim 12, wherein said parameter is formed by other operational data of another transmission.

17. A working machine according to claim 12, wherein said parameter is formed by other operational data of the power take-offs.

18. A working machine according to claim 13, wherein said parameter is formed by other operational data of the main drive.

19. A working machine according to claim 13, wherein said parameter is formed by other operational data of another transmission.

20. A working machine according to claim 13, wherein said parameter is formed by other operational data of the power take-offs.

21. A working machine according to claim 14, wherein said parameter is formed by other operational data of the main drive.

22. A working machine according to claim 14, wherein said parameter is formed by other operational data of another transmission.

23. A working machine according to claim 14, wherein said parameter is formed by other operational data of the power take-offs.

24. A working machine having implements, an evaluating and control device for generating a control signal, a power regulator, a fuel injection pump, a drive engine whose drive power is branched to a main drive and at least one power take-off for driving the implements, and wherein the drive power of the drive engine directly controls the fuel injection pump via the power regulator which, in case of altered power requirements, receives the control signal from the evaluating and control device for the fuel injection pump such that the drive engine is adapted to new power requirements.

25. A working machine according to claim 24, wherein said power regulator receives the control signal from the evaluating and control device for the injection pump such that the fuel injection quantity is adapted to the new power requirements.

26. A working machine according to claim 24, wherein the engine speed is adapted to said new power requirements.

27. A working machine according to claim 24, wherein said machine is a harvesting machine and including at least one sensor for continuously determining the quantity of crop material in the flow of crop material through the machine is provided in addition to the measuring devices, which aids in determining the power requirements needed in certain power take-offs.

28. A working machine according to claim 27, wherein said power requirements are evaluated in the evaluating and control device for controlling the drive engine.

29. A working machine according to claim 27, wherein said sensor determines the quantity of crop material before reaching the instantaneously power-limiting implement.

30. A working machine according to claim 24, wherein said power regulator includes an electronic engine management system which, with the aid of the control signal generated by the evaluating and control device, varies the power of the drive engine by engine characteristics.

31. A working machine according to claim 24, wherein the measuring devices, the evaluating and control device and the engine management system are integrated in an electronic communications network.

32. A working machine according to claim 24, wherein said machine is formed from a combination of a tractor with an implement, which is attached by the tractor, and whose implements are driven by the tractor via at least one power take-off.

33. A working machine according to claim 32, wherein power-limiting variables at individual power take-offs of said attached implement are included in calculation of the control signal for the power regulator.

* * * * *